United States Patent [19]
Giessler et al.

[11] 3,743,116
[45] July 3, 1973

[54] CENTRAL CONVEYING SYSTEM

[75] Inventors: Horst Giessler, Rheinfelden, Switzerland; Klaus Lorenz; Gerhard Brutschin, both of Wyhlen, Germany; Marc Walti, Lucerne, Switzerland

[73] Assignee: Firma Rene Blaser, Hebe-Und Maschinenbau Und Firma Translift Gesellschaft fur Hebe-Und Forderanlagen mbH, Wyhlen/Baden, Germany

[22] Filed: Jan. 7, 1972

[21] Appl. No.: 216,197

[30] Foreign Application Priority Data
Jan. 9, 1971  Germany............ P 21 00 842.4

[52] U.S. Cl............ 214/16.4 R, 214/95 R, 104/165
[51] Int. Cl................................................ B65g 1/06
[58] Field of Search............ 214/95, 16.4 R, 16.1 D, 214/16.1 DB, 16.1 CE

[56] References Cited
UNITED STATES PATENTS

| | | | |
|---|---|---|---|
| 3,337,069 | 8/1967 | Burger | 214/16.4 R |
| 3,447,704 | 6/1969 | Guilbert | 214/95 R |
| 3,521,778 | 7/1970 | Howard | 214/16.4 R |
| 3,543,952 | 12/1970 | Young | 214/16.4 A |
| 3,613,910 | 10/1971 | Weir | 214/16.4 A |

Primary Examiner—Gerald M. Forlenza
Assistant Examiner—R. B. Johnson
Attorney—Allison C. Collard

[57] ABSTRACT

A system with loading and unloading stations particularly useful for supplying hospitals, laundries, large kitchens, warehouses and the like, having movable carts capable of receiving containers to transport various supplies. The carts are transported either vertically or horizontally depending upon the building structure. Loading and unloading stations have suspension systems for the cars for loading and unloading goods of different types. Elevator cabins are provided having guide rails which are flush with additional guide rails on the floor of each cabin and each landing for moving the carts in and out of the elevator cabins. Lifting and lowering means are provided at places which the movable carts are transferred from the suspension system to the conveyor system on the floor.

9 Claims, 9 Drawing Figures

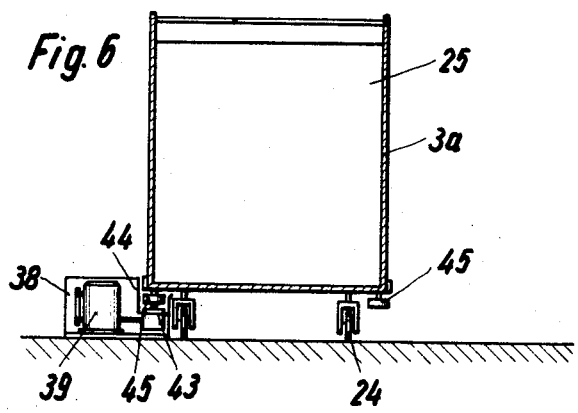
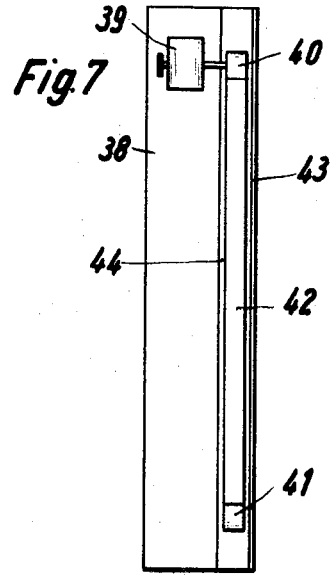

CENTRAL CONVEYING SYSTEM

This invention relates to a supply and removal system particularly for use in hospitals, laundries, large kitchens, supply houses and the like. The system consists of movable cars which receive containers to transport various foods. The transportation cars are transported either vertically or horizontally depending on the structure of the building complex.

Labor costs have been found to steadily increase in servicing industries such as hospitals, laundries, large kitchens, warehouses and the like. Not only are the costs of labor increasing, but also labor is becoming scarce in the servicing industries. This forces industry into a substantial mechanization and utilization of the labor involved. It is for example very hard to mechanize health care which is necessarily carried out by nurses and aids. It is, however, possible to mechanize the transportation of necessary goods in a hospital.

It has been already suggested that suspension baskets of hampers be provided for the transportation of goods. Conventional devices of this type essentially consist of horizontal or vertical rails which run in specially arranged shafts corresponding to the building complex. Corresponding trolleys which receive the goods may then travel on these rails.

However, it has been shown that conventional devices do not always guarantee movement of larger quantities of goods. For example, with conventional baskets, the goods must always be emptied at the desired floor by moving the goods from the baskets or trolleys onto separate carts. Naturally, this requires additional time and labor. Furthermore, during interferences and possible failures of the device, when the device runs in vertical shafts from floor to floor, very undesirable time delays are often the result especially at times when lunch is being served in hospitals. Furthermore, the shafts which are used with the conventional supply devices require additional space which substantially increases the costs where large hospital complexes are concerned.

Accordingly, the present invention provides a supply and removal system for hospitals, warehouses and the like which has advantages over the above-mentioned devices. The invention is based on the premise that the supply and removal system should function at all times without breakdowns, and should be an integral part of the building complex. In accordance with the invention, a transporting system is provided in hospitals, laundries, large kitchens, warehouses, etc., consisting of a car receiving a plurality of containers for the various goods. In accordance with the subject invention, these cars travel horizontally or vertically in the corresponding building complex. The invention provides a known suspension system for the cars, for loading and unloading of goods of different types and with lifting and lowering devices for the trolleys. Furthermore, elevators are provided having guide rails which are flush with additional guide rails on the floor of every floor. In the case of a suspension system, the elevators are provided with a suitable lifting and lowering station so as to lift and/or lower the trolleys onto the suspension system for transporting the goods.

With the system of the invention, the total flow of material and goods is carried out by one transporting plant, so as to eliminate an actual labor force for moving the goods. In accordance with the subject invention, the transportation system may be provided with an automatic control system, automatically controlling the movement of the goods. If the whole system is designed to work only at certain times so as to add to quietness in the hospital. Certain times of operation are highly desirable, particularly during the night.

The subject invention also permits the spontaneous movement of goods to be carried out despite the highly automated transporting system. With this system, goods can be transported from the kitchen, laundry, etc., to their destined places. Moreover, the spontaneous movement of goods which may be needed in any emergency may also be moved when desired. In hospitals, the goods to be transported, for example in hospitals, are foods, drinks, medicaments, china, fresh laundry and hospital beds, used laundry and garbage, sterile goods, medical instruments, devices for laboratory tests, printed material, X-Ray films, and the like. When hot food is being transported, special carts may be used which maintain the food in a hot condition during transporting.

In accordance with one embodiment of the invention, a special lifting and lowering means are provided for the trolley in a suspension system. The lifting and lowering means is provided in a housing having a part which moves upwardly and downwardly. On the lower end, this movable part carries a frame structure. Two laterial rods are mounted in an equal distance from each other on frame structures. Movable latches or hooks are mounted on the central rods, and are arranged so that the latches are in a retracted position during the lowering of the movable cart, and are in an engaged position with the cart to be transported during its lifting movement. The central rods for moving the latches or hooks are actuated during the lowering movement without any load. When the load reaches its desired destination, the latches are automatically disengaged from the container, and the hooks move into their retracted starting position. This movement may preferably be carried out by a lever provided with a cam which engages a guide in the housing. The upward and the downward movement may be carried out by the driving motor of the trolley, or by a special motor which is attached to the moveable part. If a plurality of trolleys are used, and if the lifting and lowering stations are in a given fixed position, a motor may be fixedly installed at each station. A lateral carrier rod may be installed on the axis of the motor on which two rollers are mounted. The rollers engage a U-shaped guide rail which is connected with the moveable part.

The guide conveyors consist of one, or a plurality of endless conveyor belts which may be arranged in series with respect to each other, and are driven by an electric motor. The conveyor belts run in U-shaped guide rails. The lower portion of the trolley engages the conveyor belts for transporting. The trolley may be pushed onto the guide into the normal cabin of an elevator. After the carts arrive at the desired floor, they may be pushed to their intended destination.

It is therefore an object according to the present invention to provide a supply and removal system particularly for hospitals, wherein automatic systems control the travel of movable carts to various vertical and horizontal positions within a building structure.

It is another object according to the present invention to provide a supply and removal system which is simple in design, reliable in operation, and efficient in use.

Other objects and features of the present invention will become apparant from the following detailed description considered in connection with the accompanying drawings which disclose the embodiments of the invention. It is to be understood, however, that the drawings are designed for the purpose of illustration only and not as a definition of the limits of the invention.

In the drawings wherein similar reference characters denote similar elements throughout the several views:

FIG. 6 is a front view of the guide means and a trolley positioned thereon;

FIG. 7 is a plan view of the guide rail and a trolley positioned thereon, according to FIG. 6;

Figure 1:
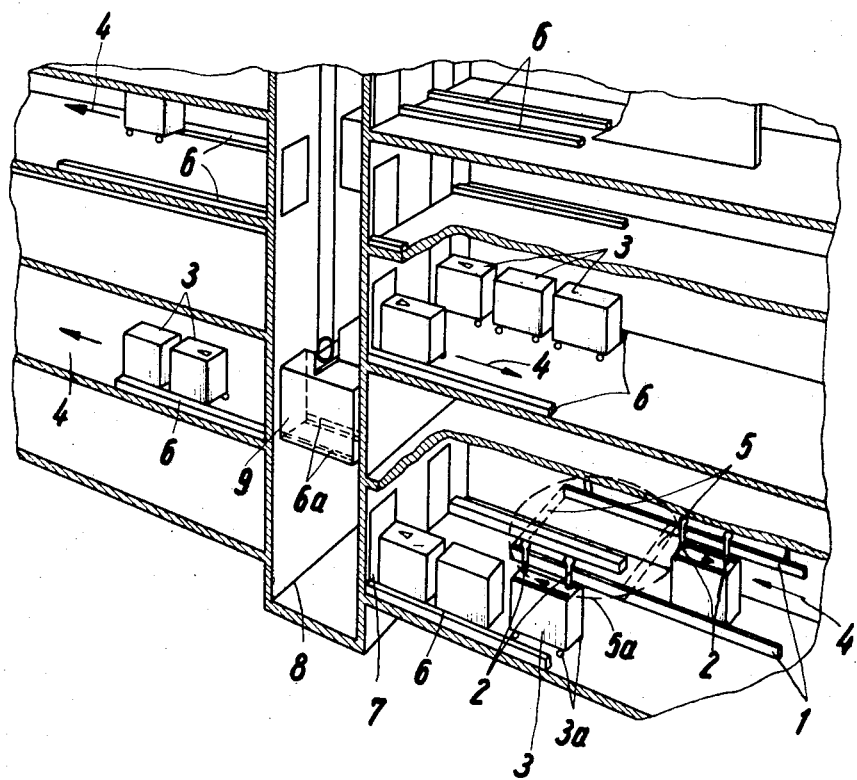
FIG. 1 is a cross-sectional view of the supply and removal system in accordance with the invention.

Referring to FIG. 1, there is shown the principle of operation of the inventive device consisting essentially of a known suspension system having two guide rails. The drawing only shows two guide rails 1, and a lifting and lowering means for trolleys 2. Carts 3a, which are suspended from the trolleys may be provided with a container 3 which receives the goods to to be transported. Carts 3a and container 3 are loaded and or unloaded at their respective stations such as, for example, in the kitchen, at the patient's bedside, in a laundry or laboratory, etc. The containers are then moved to their intermediate and end positions in the direction of arrow 4 of FIG. 1. At the end station, the containers or trolleys are put on the next section of guide rail by means of a pushcart, the principle of which is shown by broken lines 5. They can also be put onto the next section of the guide rail by means of a turning disc 5a, and then lowered. After the lowering operation takes place, car 3a is separated from the trolley, and the trolley can be returned to its loading and/or unloading station, respectively.

The cart to be transported is moved on a guide 6 which moves the cart automatically to an opening 7 which leads to an elevator shaft 8. The floor of elevator cabin 9 is also provided with a guide rail 6a of guide 6. This section of the guide rail corresponds and connects with proper guide rails on each floor. Preferably, two additional guide means are suitably arranged on each side of the elevator shaft and the hallways, in order to facilitate the movement of the carts. One series of these guides may be used for transporting the goods, while the other series may be used for removing the used goods. By using normal elevators when the goods are loaded and unloaded, the system will still reliably function during an emergency, when a part of the system has been disabled. It should be noted that all transport units can be easily reached, even the ones which are transported in a vertical direction. This is a very important embodiment of the inventive transporting system with respect to conventional vertical and/or horizontal transporting systems. The movement of the transporting systems in the vertical direction may also be carried out in two different directions. This is particularly advantageous in the area where patients are treated. Two or more guide rails may be provided on the same level going in different directions such as, for example, on one floor. The space and energy consumption necessary for moving the transporting system in a vertical direction may be adjusted depending upon whether it is to be used in a two-story or a twelve-story building. Finally, each sending and receiving station can be fitted with bumper stretches, so that no waiting periods exist for personnel at the sending or receiving stations.

After the carts are removed from the elevator, the elevator closes its cabin automatically so that no drafts or accidents can occur, due to, for example, open trolleys. Furthermore, the elevator eliminates the need for scanning elements to guide the trolleys out of the vertical position. Furthermore, these guide elements within the elevator shaft would not only be inaccessible during a breakdown period, but would also increase the maintenance costs.

As can be seen from FIG. 1, the movement of carts 3a from the suspended position onto the floor position takes only place at the lowest level of the elevator position, and does not take place at every floor. Thereby, the novel system functions perfectly. Guide rails 6 on which carts 3a are moved, are located flush on the floor of an elevator cabin, and do not contain any grooves which would be subject to dirt accumulations.

Figure 2:
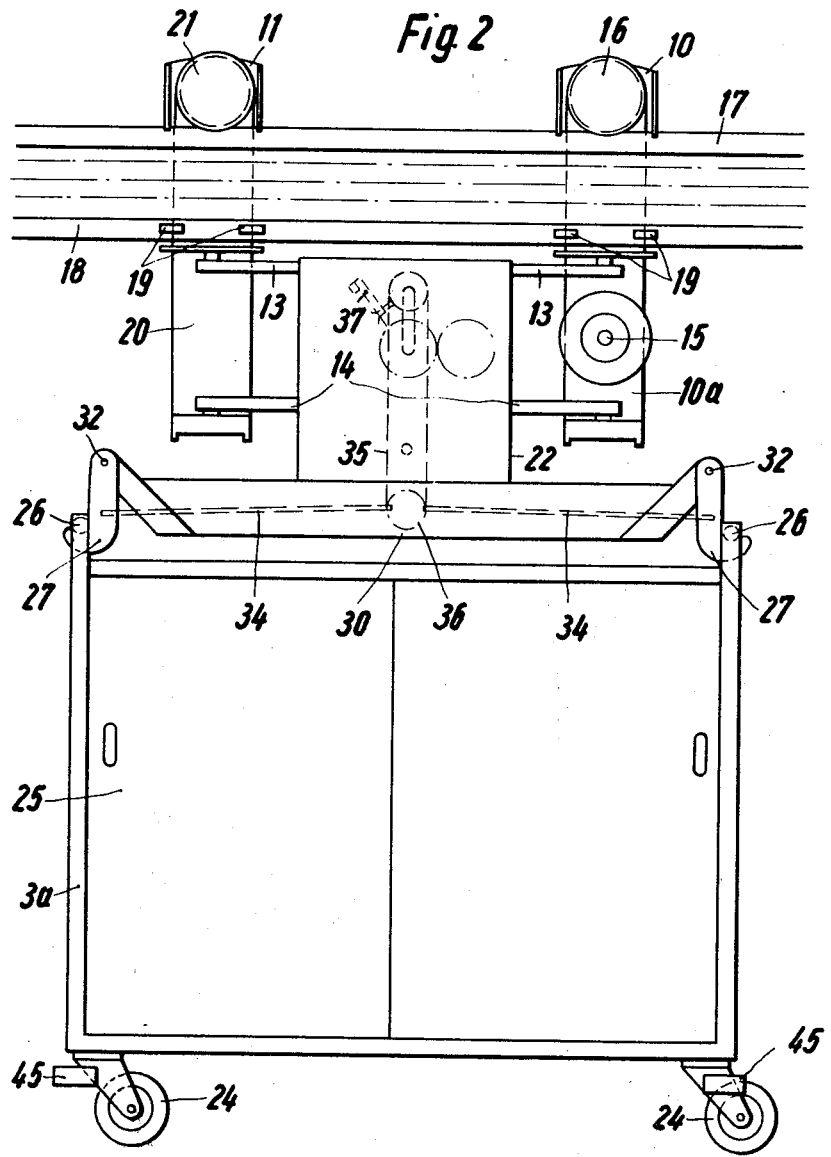
FIG. 2 is a side view of a trolley in a suspended position.

As can be seen from FIG. 2, trolley 2 of FIG. 1 is provided with a motor-driven means 10 and rollers 11. Both of the driving means are rotatably connected which each other by means of lateral rods 13 and 14. Motor means 10 is driven by a motor 15. Motor 15 is positioned in a U-shaped housing. A roller 16 is provided at the upper leg of the U-shaped housing. The roller runs on a portion 17 of the guide rail. Rail portion 17 is connected with a pipe-like portion 18 of the guide rail by means of a lateral rod which is engaged by four horizontal guide rollers, two of which are shown as rollers 19. The control of drive motor 15 is carried out by means of electrical contact lines between rail portions 17 and 18. Roller drive 11 is constructed in a similar fashion, but without a drive motor. In a similar U-shaped frame 20, the non-driven carrier roller 21 is mounted on the upper portion thereof. Furthermore, four horizontal guide rollers 19 are provided which engage lower portion 18 of the guide roller. Due to the mobility of the two U-shaped frames 10a and 20 with respect to their lateral connections 13 and 14, relatively narrow curves can be travelled. A housing 22 is mounted on both connecting joints 13 and 14 for receiving the lifting and lowering mechanism. In this embodiment, car 3a is of a frame construction with guide rollers, and receives a container 25. The entire construction is attached to the lifting, and lowering mechanism. The upper part of the construction is provided with two lateral rods 26 which are mounted on the upper part of car 3a. Four latch hooks 27 engage the car and maintain it in the lifted position.

Figure 3:
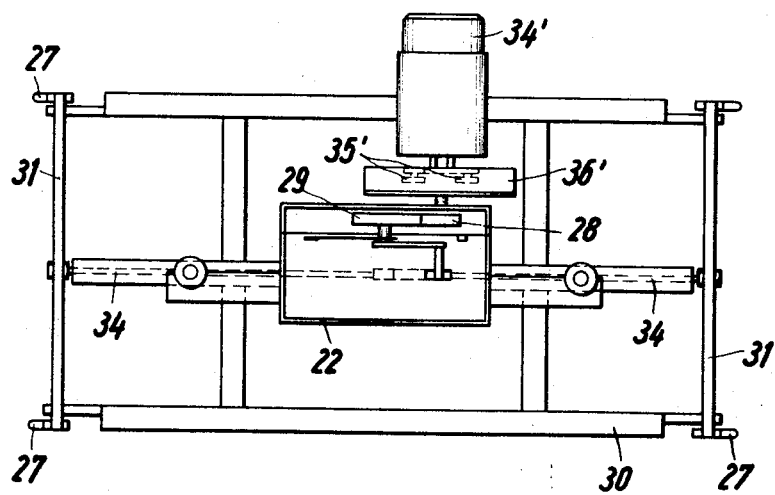
FIG. 3 is a plan view of the lifting and lowering means without the trolley.
Figure 4:
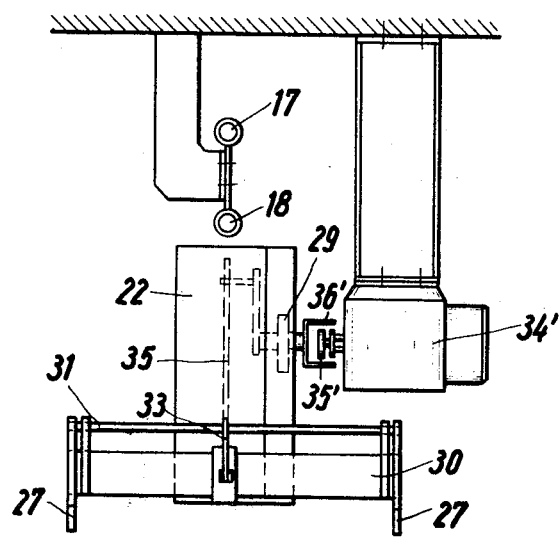
FIG. 4 is a front view of the lifting and lowering device without the trolley, showing the guide rail in profile.

The lifting and lowering mechanism is best described in detail with reference to FIGS. 2, 3 and 4. Housing 22 encompasses a gear drive, consisting of two gears 28 and 29. Gear 28 can be moved directly by a motor engaging the gear, or by a stationary motor at the lifting and lowering station. Due to the turning of the movable part in housing 22, which is connected to frame construction 30, the movable part can be moved upwardly or downwardly, respectively. Frame construction 30 can thus be lowered and/or lifted. The latch hooks 27 as shown in FIGS. 2 and 3, are rotatably connected by means of lateral rods 31. Rods 31 are connected with a lever 33 to a central rod construction 34 so that a lateral movement of rods 34 to the inside or the outside moves the latches either to the inside or the outside. Central rod 34 is moved by a chain 35 and its sprocket 36, depending on the position of lever 37. As long as the lever is moved, hooks 27 stay in their respective positions. When frame construction 30 is lowered, and when a cart is suspended from hooks 27, the hooks are drawn to the inside when they have reached their lowermost positions. The hooks thus disengage from lateral rods 26 and release cart 3a. When the hooks lift the frame construction 30, they stay in position until the entire construction has been lowered again to a cart. In this case, hooks 27 again engage lateral rods 26 and remain in this position until the cart has been lifted, transported, and lowered again. For this purpose, a special guide is provided in housing 22. Lever 37 engages the guide with a special abutment. Each time frame construction 30 travels through its lowermost point, lever 37 engages the guide to move central rods 34 to either receive a new cart, or release a cart. As can be seen from FIGS. 3 and 4, a fixed motor 34' is provided at each lowering and lifting station. Two rotatable rollers are mounted on a lateral rod. The drive for the trolley is automatically switched off when the trolley reaches a loading and unloading station. In this case, two rollers 35' are positioned in the inside of a U-shaped guide rail 36 which is connected with gear 28 by means of a shaft. To lift or lower carts 3a, motor 34' is switched on and the rotational movement is transferred to the U-shaped guide rail 36' since gear 28 is moved. The lifting and lowering mechanism in housing 22 can thus be actuated as already disclosed above.

Figure 5:
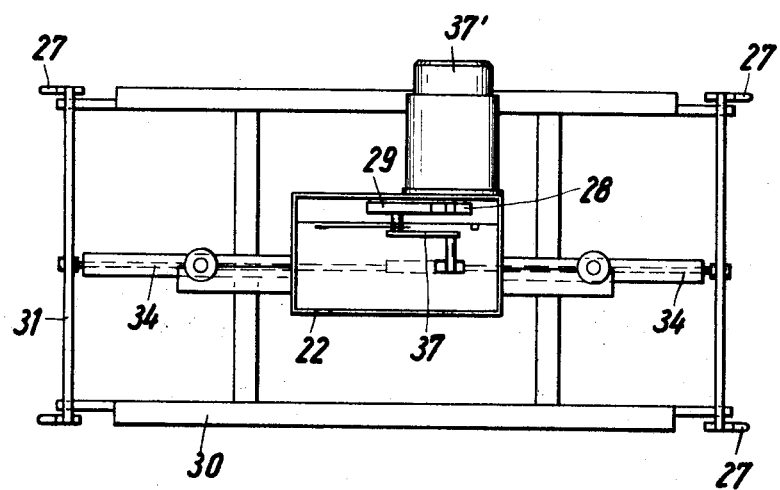
FIG. 5 shows a lifting and lowering device without a trolley but with an installed drive motor.

In FIG. 5, a special motor 37' is provided which is connected directly to housing 22. Gear 28 is positioned on the shaft of housing 22. This embodiment of the invention is advantageous because lifting and lowering can be performed independently from a defined station. However, if a plurality of trolleys are used so that the lifting and lowering mechanism must always be actuated at the same places, the mechanism described with respect to FIGS. 3 and 4 would be more advantageous, because only one motor 34' would be required.

FIGS. 6 and 7 show the guide conveyor which takes care of moving the individual cars in and out of elevator cabin 9 with the help of a suspension system. As can be seen from FIG. 1, cart 3a is lowered onto guide 6 which is mounted in the floor of the system. The guide carrier consists of a longitudinal housing 38 (FIG. 6) wherein a drive motor 39 is mounted. Motor 39 drives a second roller 41 and an endless conveyor belt 42 by means of a roller 40. Housing 38 is U-shaped in the range of belt 42, thereby two guide faces 43 and 44 are provided. Guide rollers 45 are mounted on the lower edges of cart 3a which are guided between guide rails 43 and 44. Cart 3a engages the endless conveyor belt on only one side, as can be seen in FIG. 6, so that one side of the cart is lifted slightly from the bottom. Thus, only the right rollers 24 of the cart engage the floor. The cart can then be transported by endless belt 42. In order for a plurality of carts to run through a large stretch, as shown in FIG. 7, the carts are switched in series with respect to each other. The same units are also present in the inside of elevator cabin 9, and designated as 6a, in FIG. 1. The drive is so arranged that the carts are loaded on one side of the elevator cabin, and unloaded on the other side thereof. After the carts have been received at their designated stations, they are simple pushed to their designated stations which may all be on one floor.

Figure 8:
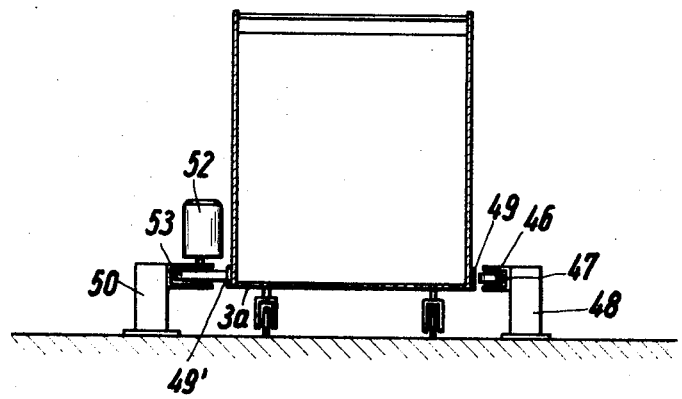
FIG. 8 is a front view of a different embodiment of a guide rail.
Figure 9:
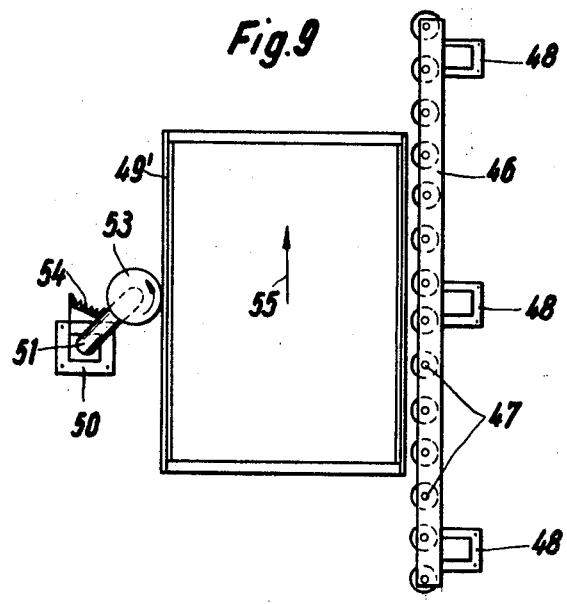
FIG. 9 is a plan view of the guide rail of FIG. 8.

A further embodiment of the guiding system is shown in FIGS. 8 and 9. A plurality of pivotably supported guide rollers 47 are arranged in a predetermined spaced-apart distance from each other on a U-shaped rail 46. Guide rail 46 is mounted away from the floor by support carriers 48. A guide rail 49 is also mounted on the underside of the cart 3a and is positioned opposite to rollers 47. A roller 53 is driven by a motor 52 and is carried on a support 50 by means of a lever arm 51. Roller 53 is pressed against a second guide rail 49' by means of a spring 54. Cart 3a is thus pressed against rollers 47 and moved forward in the direction of arrow 55, after contact roller 53 is actuated. The drive can also be actuated in the opposite direction. The system may have a conventional or a central control. The control encompasses five main groups:

1. Controlling at the loading station.
2. The control of individually selected or preprogrammed automatic transport operations.
3. Controlling the arrival at the unloading station.
4. The addressing of the carts for the unloading station.
5. General control.

The control of the system could be performed by data cards. It is essential that the individual carts neither receive the arrival codes, or have to be interrogated for direction at each branch, so that mistakes can be eliminated. Furthermore, the speed of the transport system can be controlled so that an even flow is guaranteed, and there is a safe operation and function of the device. A preprogrammed flow of certain materials may also be introduced.

The following example will illustrate the operation and function of the loading and unloading. The example given shows and explains the traveling path of a supply cart from the upper floor of a large hospital building. The loaded cart is manually pushed onto the station and automatically transported to the unloading station by the introduction of a programmed data card, or by pushing a control knob. The control device receives and reads the data and moves the cart to its destination. The cart is received, for example, by a trolley, and automatically moved to its destination. The transport unit consists of the wheels and the cart, and is automatically moved from the loading station to its intended destination. The various branches along its way are also automatically controlled. When the transport unit arrives at its destination, the unit is transferred from the suspension to the conveyor system on the floor at a so called transfer station. While the wheels of the unit are free for the next transport, the control device opens the elevator automatically and moves the unit into the elevator cabin by means of the endless transport belts which are mounted at the floor level. After the elevator door closes, the elevator moves the unit to its designated floor. The elevator door then opens automatically on its receiving side and the unit moves out of the elevator as shown in FIG. 1.

While only a few embodiments of the present invention have been shown and described, it will be obvious that many changes and modifications may be made thereunto without departing from the spirit and scope of the invention.

What is claimed is:

1. A multi-floor building containing facilities such as those located in hospitals, warehouses, laundries and kitchens, the improvement comprising: a supply and removal system having loading and unloading stations located on each floor of the building, movable carts having removably mounted containers located thereon for transporting articles to selected horizontal and vertical locations within said building, a plurality of suspension means, a cart lifting and lowering station adjacent each end of a respective one of said suspension means, means mounting one end of said suspension means adjacent one of said loading and unloading station, said mounting means for said suspension means being located vertically above a floor of said building, movable cart handling means having lifting and lowering means thereon, means mounting said movable cart handling means on said suspension means, elevator means located adjacent each of said suspension means and loading and unloading stations, said elevator means including floor means, hoist means for selectively placing the floor of said elevator means in substantial coplanar alignment with the floors of said building, first cart guiding and moving means mounted on said floor means of said elevator means for moving said carts onto and off said elevator means, second cart guiding and moving means mounted on each floor of said building adjacent said elevator means, one of said second cart guiding and moving means being located between said lifting and lowering station and said elevator means and being operative for moving said movable carts from a location below said suspension means to a cooperative position with said first cart guiding and moving means and vice versa, said first and second cart guiding and moving means being of substantially the same construction.

2. The building according to claim 1, wherein said cart handling means having lifting and lowering means comprises a trolley mounted on said suspension system, a housing having a movable portion for supporting said lifting and lowering means, a frame structure depending the lower part of said housing, at least two lateral rods mounted on said frame structure and equally spaced from each other, hooks mounted on said lateral rods, hook control means mounted on said frame structure for actuating said hooks during the lowering of the movable portion of said housing, said hooks having a retracted position, and a gripping position for engaging the carts so that the carts can be raised and lowered.

3. The building according to claim 2, wherein said hook control means for moving said hooks into a cart engaging position, and into a disengaging position comprises a toothed gear drive, mounted on said housing for raising and lowering the movable portion of said housing, a guide mounted on said housing, and a cam coupled to said hooks and engaging said guide within said housing for actuating said hooks.

4. The building according to claim 3, additionally comprising an electric motor mounted on said housing for lifting and lowering said frame.

5. The building according to claim 3, comprising a stationary electric motor mounted at each lifting and lowering station, a U-shaped guide rail mounted on said housing, a pair of rollers mounted on said motor shaft and engaging the inside of said U-shaped guide rail, said U-shaped rail being further connected with said lowering means within said housing.

6. The building according to claim 1, wherein said cart guiding and moving means comprising endless conveyor belts disposed in front and in back of said elevator means, an electric motor driving said belts, a U-shaped belt guide containing said belts, a plurality of rollers mounted on the lower portion of said carts and engaging said belts for moving the carts in a horizontal direction.

7. The building according to claim 1, wherein said cart guiding and moving means comprise a plurality of U-shaped guide rails, a plurality of rollers pivotably mounted in said U-shaped rails, a second guide rail mounted on the lower part of the cart for engaging said rollers, a third guide rail on the opposite side of said cart, a contact roller urged against said third rail, and a motor driving said contact roller for moving the carts in a horizontal direction.

8. The building according to claim 7, wherein said U-shaped guide rails are mounted in series with respect to each other.

9. The building according to claim 1, comprising turning discs mounted in front of the lifting and lowering stations adjacent said elevator means.

* * * * *

UNITED STATES PATENT OFFICE
CERTIFICATE OF CORRECTION

Patent No. 3,743,116        Dated July 3, 1973

Inventor(s) Horst Giessler et al

Figure 10:
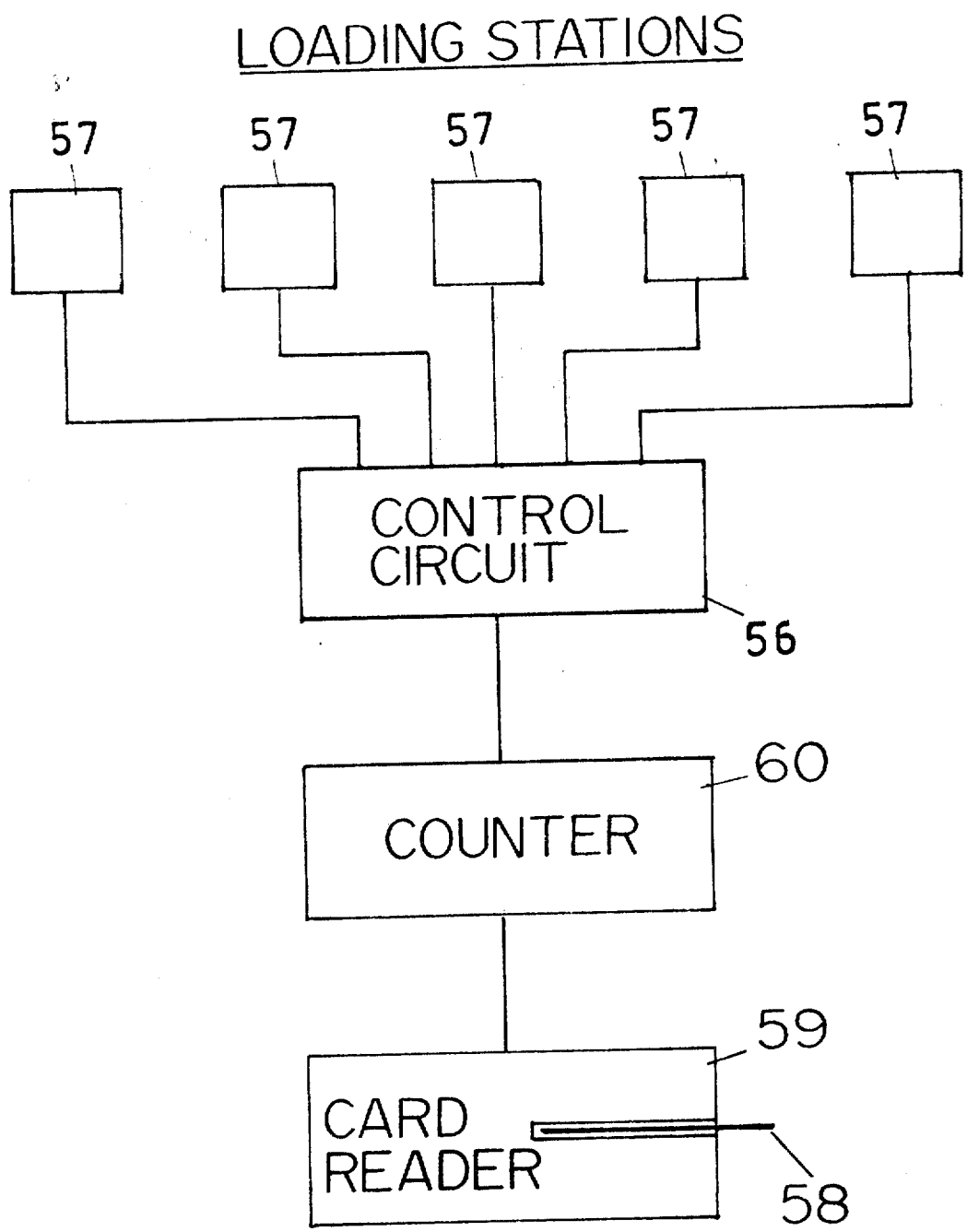

It is certified that error appears in the above-identified patent and that said Letters Patent are hereby corrected as shown below:

Col. 3, line 30, after "Fig. 8." add --Fig. 10 is a block diagram of a control system for the supply and removal system of the invention.--.

Col. 7, line 3, insert --Fig. 10 illustrates a control system which may be used for the supply and removal system of the invention. Lifting and lowering stations 57 are coupled to, and are controlled by, a control circuit 56. The control circuit receives data from a counter 60 which is coupled thereto. The data is contained on punch card 58 and is read from the card by an optical reader 59.--

Col. 8, line 50, insert --10. The supply and removal system according to claim 9, further comprising a control system having a data system and selection system for advancing said carts selectively to and from the loading stations and unloading stations.--.

IN THE DRAWING: --Add Fig. 10 to the drawings--
(See attached sheet)

In addition, Column 3, line 29, cancel "and," and in column 3, line 30, after "8", cancel "." and insert -- ; and, --.

Signed and sealed this 26th day of March 1974.

(SEAL)
Attest:

EDWARD M. FLETCHER, JR.        C. MARSHALL DANN
Attesting Officer        Commissioner of Patents